United States Patent
Hatakeyama

(10) Patent No.: US 8,001,592 B2
(45) Date of Patent: Aug. 16, 2011

(54) METHODS AND APPARATUS FOR ACCESSING RESOURCES USING A MULTIPROCESSOR IN A TRUSTED MODE

(75) Inventor: Akiyuki Hatakeyama, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 801 days.

(21) Appl. No.: 11/746,338

(22) Filed: May 9, 2007

(65) Prior Publication Data

US 2008/0282342 A1  Nov. 13, 2008

(51) Int. Cl.
  *G06F 21/00* (2006.01)
  *G06F 12/14* (2006.01)
(52) U.S. Cl. ......... 726/17; 713/189
(58) Field of Classification Search ......... 726/17
  See application file for complete search history.

(56) References Cited

U.S. PATENT DOCUMENTS

| | | | | |
|---|---|---|---|---|
| 5,615,263 | A * | 3/1997 | Takahashi | 713/164 |
| 6,526,491 | B2 | 2/2003 | Suzuoki et al. | |
| 2004/0255169 | A1 * | 12/2004 | Little et al. | 713/202 |
| 2005/0071651 | A1 * | 3/2005 | Aguilar et al. | 713/189 |

OTHER PUBLICATIONS

Sony, Cell Broadband Engine Architecture, http://cell.scei.co.jp/e_download.html (Aug. 8, 2005).
Sony, Cell Broadband Engine Architecture, http://cell.scei.co.jp/e_download.html (Oct. 3, 2006).

* cited by examiner

*Primary Examiner* — Gilberto Barron, Jr.
*Assistant Examiner* — Cordelia Zecher
(74) *Attorney, Agent, or Firm* — Matthew B. Dernier, Esq.; Gibson & Dernier LLP

(57) ABSTRACT

A system and method are disclosed which may include entering a secure mode by a processor, whereby the processor may initiate a transfer of information into or out of the processor, but no external device may initiate a transfer of information into or out of the processor; sending a DMA (direct memory access) command including at least one authorization code from the processor to at least one trusted data storage region external to the processor; evaluating the authorization code; and enabling the processor to access at least one trusted data storage location within the trusted data storage region if the authorization code is valid.

49 Claims, 10 Drawing Sheets

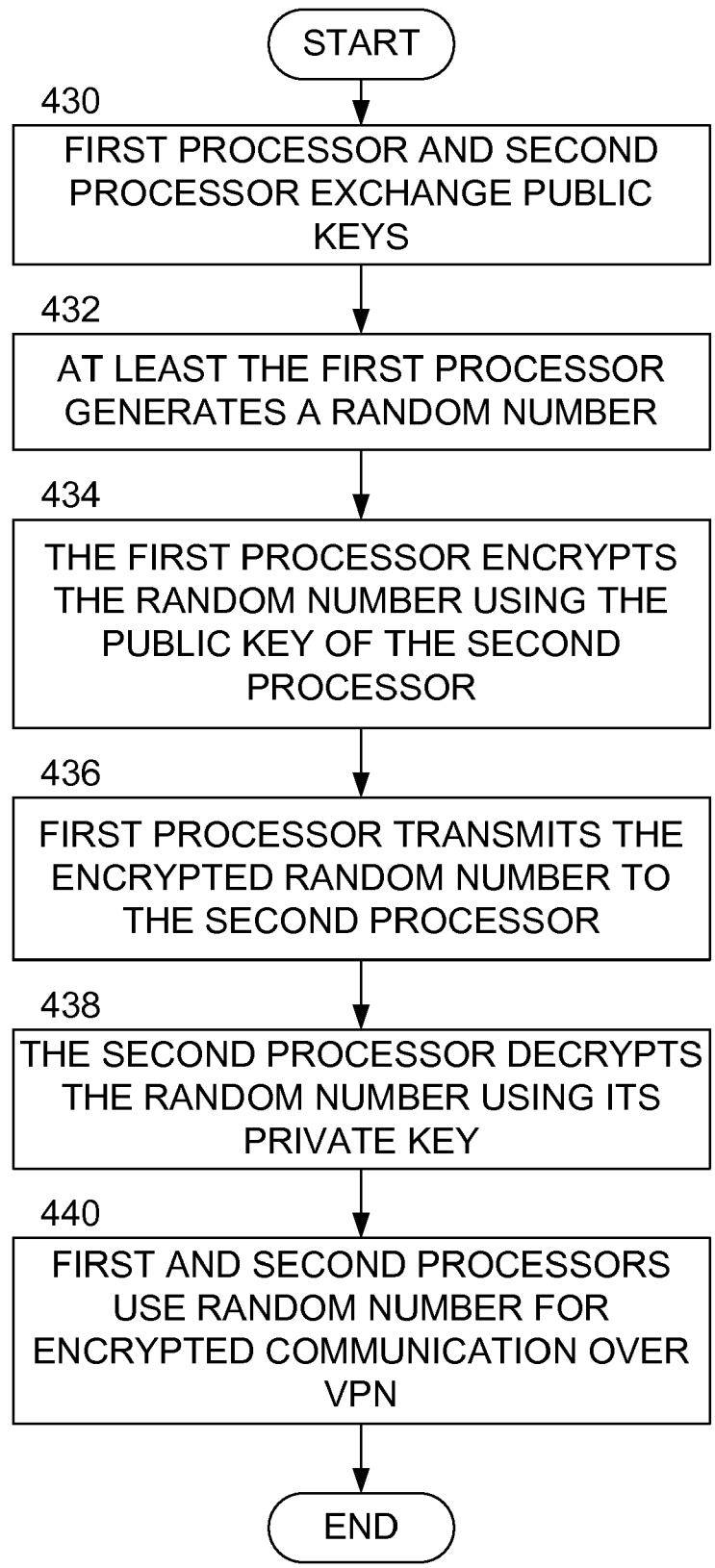

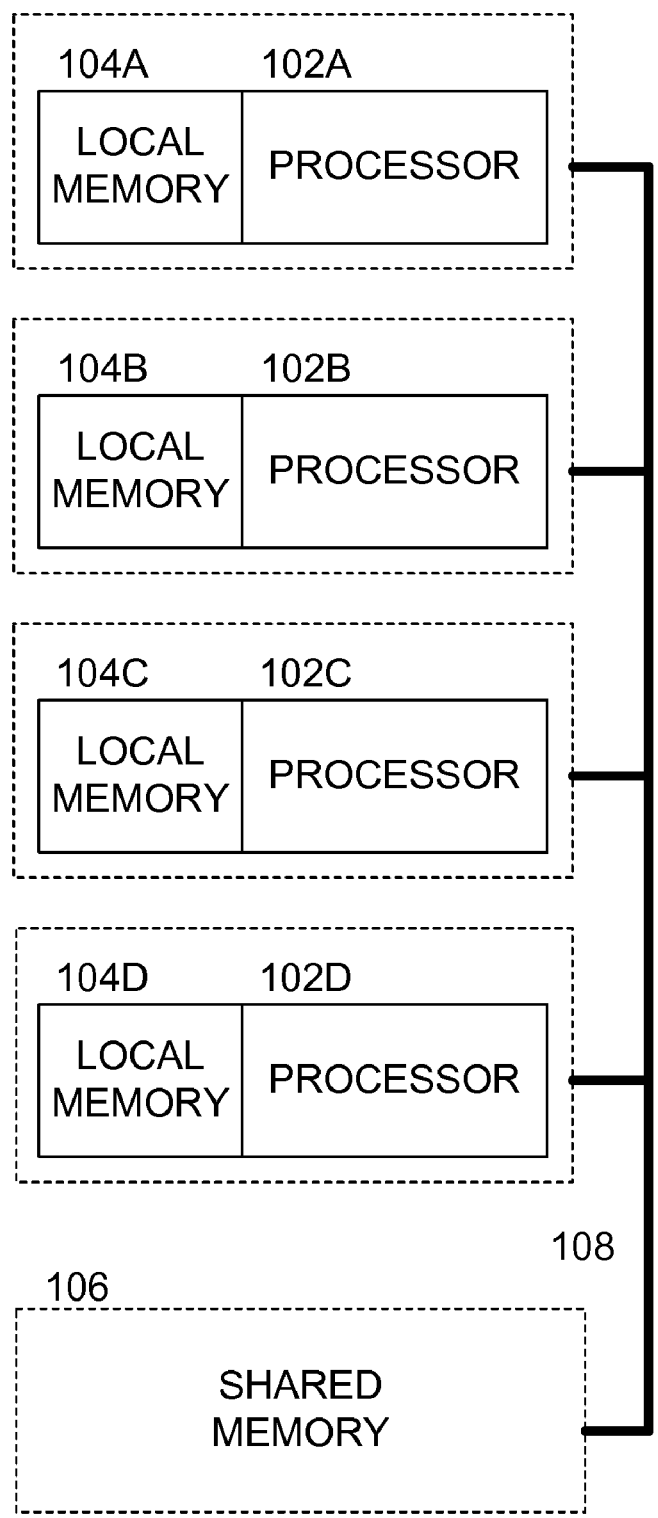

METHODS AND APPARATUS FOR ACCESSING RESOURCES USING A MULTIPROCESSOR IN A TRUSTED MODE

BACKGROUND OF THE INVENTION

In recent years, there has been an insatiable desire for faster computer processing data throughputs because cutting edge computer applications are becoming more and more complex, and are placing ever increasing demands on processing systems. Graphics applications are among those that place the highest demands on a processing system because they require large numbers of data accesses, data computations, and data manipulations within relatively short time periods to achieve desirable visual results. Real-time, multimedia applications also place a high demand on processing systems; indeed, they require extremely fast processing speeds, such as many thousands of megabits of data per second.

While some processing systems employ a single processor to achieve fast processing speeds, others are implemented utilizing multi-processor architectures. In multi-processor systems, a plurality of sub-processors can operate in parallel (or at least in concert) to achieve desired processing results. It has also been contemplated to employ a modular structure in a multi-processing system, where the computing modules are accessible over a broadband network (such as the Internet) and the computing modules may be shared among many users.

A problem arises, however, when a processing system is used over a network or is part of a shared resource. In particular, the processor and its associated software (such as the boot code) are subject to outside influences such as intentional hacking and the like. Moreover, a processor may access a data storage region which contains malicious executable code or obsolete and/or inaccurate data.

Security measures may be implemented to address these concerns. Specifically, a given processor may be operated in various modes in which access to data within the processor by outside devices is limited and/or in which access to data outside the given processor by the processor is restricted. Such measures may provide increased security and may enable a processor to access data within an internal data storage region with confidence that the data and/or code therein is reliable. However, such security measures may severely limit the amount of data storage space accessible by the processor subject to one or more security measures during many desirable data processing operations.

Accordingly, there are needs in the art for new methods and apparatus for providing data storage space that is secure and that is not unduly limited in size.

SUMMARY OF THE INVENTION

According to one aspect, the invention provides a method which may include entering a secure mode by a processor, whereby the processor may initiate a transfer of information into or out of the processor, but no external device may initiate a transfer of information into or out of the processor; sending a DMA (direct memory access) command including at least one authorization code from the processor to at least one trusted data storage region external to the processor; evaluating the authorization code; and enabling the processor to access at least one trusted data storage location within the at least one trusted data storage region if the authorization code is valid. Preferably, the DMA command specifies a physical memory address not subject to alteration by a memory address offset or by memory address translation. Preferably, the DMA command is transmitted by a memory flow controller within the processor. Preferably, the method may further include prohibiting access to memory-mapped input-output registers of the memory flow controller by entities other than the processor when the processor is in the secure mode. Preferably, the evaluating step is performed by an access circuit within the at least one trusted data storage region.

Preferably, the evaluating step comprises: comparing the authorization code to a predetermined code. Preferably, the authorization code is associated with the processor such that the at least one trusted data storage location is accessible only by the processor. Preferably, the at least one trusted data storage location is accessible by any processor in the secure mode issuing a DMA command therefrom that includes the authorization code. Preferably, the at least one authorization code provides access to any data storage location within the at least one trusted data storage region. Preferably, the at least one authorization code provides access to a subset of a plurality of trusted data storage locations within the at least one trusted data storage region. Preferably, the at least one trusted data storage region is located in one of the group consisting of: a main memory of a multiprocessor system including the processor, at least one hardware register, local storage of the processor, and another processor within the multiprocessor system including the processor. The method may further include establishing a different authorization code for each of a plurality of trusted data storage locations within the at least one trusted data storage region. The method may further include establishing a single authorization code for all of a plurality of trusted data storage locations within the at least one trusted data storage region.

According to another aspect, the invention provide a method which may include entering a secure mode by a first processor, whereby the processor may initiate a transfer of information into or out of the processor, but no external device may initiate a transfer of information into or out of the processor; preparing a DMA command including at least one authorization code to enable a data transfer operation at least one trusted data storage region external to the first processor; establishing a virtual private network (VPN) between the first processor and a second processor; encrypting the DMA command in accordance with the VPN; and transmitting the encrypted DMA command over the VPN to the second processor. Preferably, the DMA command specifies a physical memory address not subject to alteration by a memory address offset or by memory address translation. The method may further include decrypting the DMA command at the second processor. Preferably, the method may further include sending the DMA command to the at least one trusted data storage region. The method may further include evaluating the authorization code at the at least one trusted data storage region; and conducting the data transfer operation if the authorization code is valid.

Preferably, the conducting step comprises: performing a store operation to at least one trusted data storage location within the at least one trusted data storage region. Preferably, the conducting comprises: performing a load operation from at least one trusted data storage location within the at least one trusted data storage region. Preferably, the store operation comprises: encrypting data for the store operation at the first processor in accordance with the VPN; transmitting the data to the second processor; decrypting the data at the second processor; sending the decrypted data to the trusted data storage region; and saving the data in at the at least one trusted data storage location.

The method may further include transmitting data from the load operation from the trusted data storage region to the second processor; encrypting the data at the second processor in accordance with the VPN; sending the encrypted data from the second processor to the first processor; decrypting the encrypted data at the first processor; and storing the decrypted data in the first processor. Preferably, the second processor is on a same multiprocessor system as the first processor. Preferably, the first processor is located within a first multiprocessor system and the second processor is located within a second multiprocessor system. The method may further include establishing a second VPN between the second processor and a third processor; encrypting the DMA command according to the second VPN; and sending the DMA command from the second processor to the third processor. The method may further include decrypting the DMA command at the third processor; and sending the DMA command to the trusted data storage region.

Other aspects, features, advantages, etc. will become apparent to one skilled in the art when the description of the preferred embodiments of the invention herein is taken in conjunction with the accompanying drawings.

BRIEF DESCRIPTION OF THE DRAWINGS

For the purposes of illustrating the various aspects of the invention, there are shown in the drawings forms that are presently preferred, it being understood, however, that the invention is not limited to the precise arrangements and instrumentalities shown.

FIG. 5 is a flow diagram of a method for establishing a VPN between two processors in accordance with one or more embodiments of the present invention;

FIG. 6 is a diagram illustrating a multiprocessing system that may be adapted to practice one or more embodiments in accordance with one or more further embodiments of the present invention;

DETAILED DESCRIPTION OF THE PREFERRED EMBODIMENTS

Figure 1:
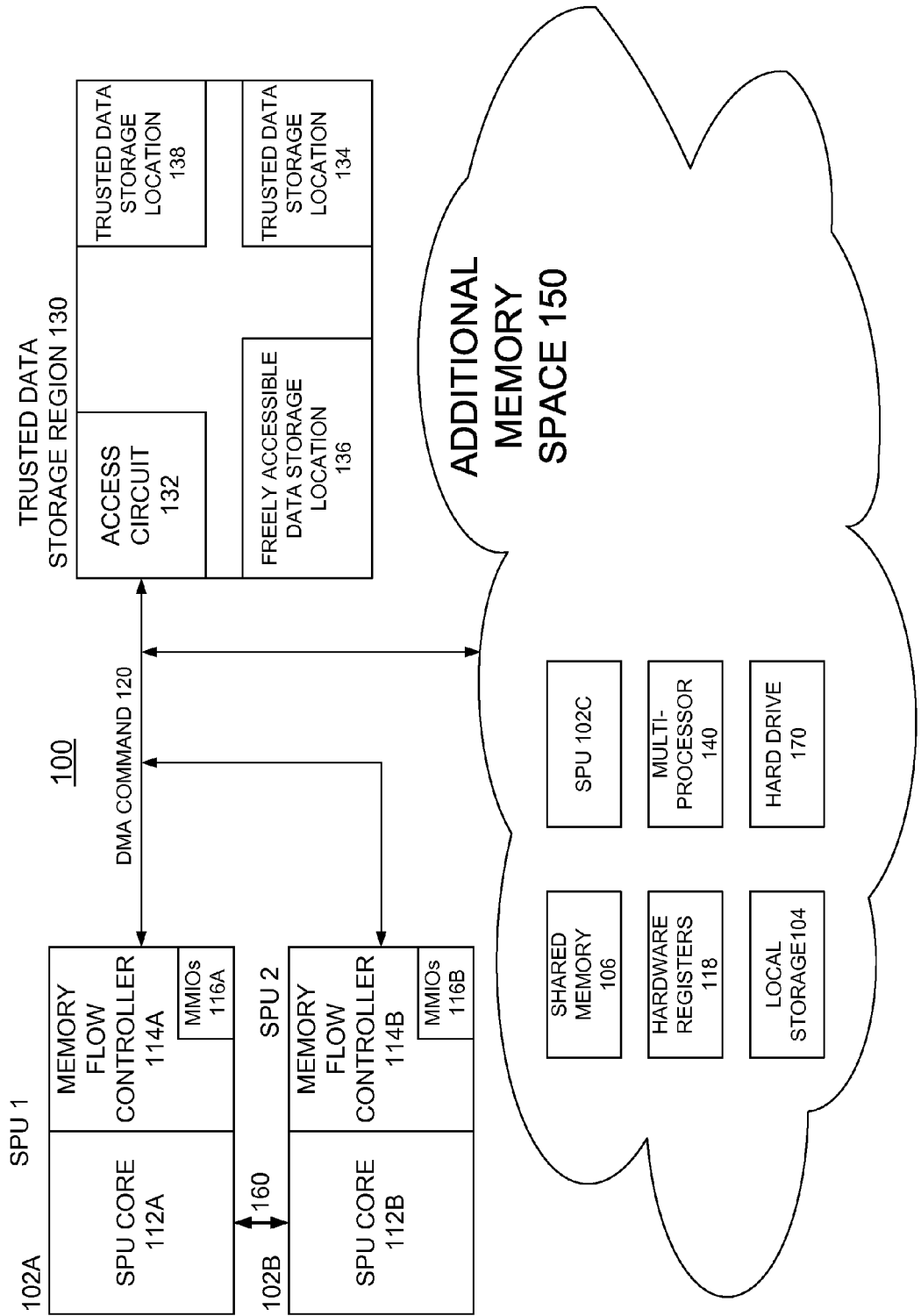
FIG. 1 is a block diagram of a data processing system including a plurality of processors (SPUs) operable to access one or more trusted data storage regions in accordance with one or more embodiments of the present invention.

FIG. 1 is a block diagram of a data processing system 100 including a plurality of processors (SPUs) 102A, 102B (collectively SPUs 102) operable to access a trusted data storage region 130 in accordance with one or more embodiments of the present invention. While the discussion of FIG. 1 is mostly directed to the description of a system, one or more of the drawing components therein may also be used to illustrate one or more method steps in accordance with one or more embodiments of the present invention. Herein the term "SPU 102" is employed to refer to either SPU 102A or SPU 102B or other SPUs of the same or similar construction.

In one or more embodiments, data processing system 100 may include SPUs 102A and 102B, communication link 160, trusted data storage region 130, and additional memory space 150. The following description of "processor 102" may apply to one or more embodiments of SPU 102A and/or SPU 102B. Herein, the term "processor 102" corresponds to the term "SPU 102."

SPU 102 may be implemented utilizing any of the known technologies that are capable of requesting data from a system memory (not shown), and manipulating the data to achieve a desirable result. For example, SPU 102 may be implemented using any of the known microprocessors that are capable of executing software and/or firmware, including standard microprocessors, distributed microprocessors, etc. By way of example, SPU 102 may be a graphics processor that is capable of requesting and manipulating data, such as pixel data, including gray scale information, color information, texture data, polygonal information, video frame information, etc.

In one or more embodiments, each SPU 102 may include SPU core 112 and memory flow controller 114 which in turn may include memory-mapped input-output registers 116. SPU core 112 may include a central processing unit (CPU) and other conventional hardware. Memory flow controller 114 preferably includes a direct memory access controller (DMAC) and is preferably operable to coordinate direct transfer of data between memories accessed by SPU 102 and data storage space within SPU 102, in response to DMA commands 120. Communication link 160 may be used to enable data communication between SPUs 102A and 102B.

In one or more embodiments, data processing system 100 may include trusted data storage region (trusted region) 130. It will be appreciated that in one or more embodiments, system 100 may include a plurality of such trusted regions. Trusted data storage region 130 may include at least one access circuit 132, one or more trusted data storage locations 134 and 138, and one or more freely accessible data storage locations 136. In one or more embodiments, trusted data storage region 130 may include trusted data storage locations (trusted locations) 134 and 138. Although two such trusted data storage locations 134, 138 are shown within storage region 130, storage region 130 may include fewer or more than two such trusted data storage locations.

In one or more embodiments, access circuit 132 may serve to control access to one or more trusted data storage locations by comparing one or more authorization codes accompanying DMA commands 120 to one or more predetermined codes. Access circuit 132 may include hardware, firmware running on a processor, and/or a combination of hardware, firmware, and/or software for performing the pertinent data comparisons.

In a preferred embodiment, trusted data storage location 134 includes one or more hardware registers 118. However, other data storage devices may be employed. Specifically, trusted data storage location 134 may be located in one or more of the following (shown in "additional memory space" 150): shared memory 106 (which may be located in the same multiprocessor system as SPU 102), hardware registers 118, local storage 104 (data storage local to a processor 102), on another storage location within multiprocessor system 140, and/or hard drive 170. While for the sake of convenience, the above discussion was directed to trusted location 134, the discussion is equally applicable to trusted location 138.

In one or more embodiments, trusted data storage region 130 may include at least one freely accessible data storage location 136, access to which may be obtained without a need for an authorization code.

In one or more embodiments, one or more communication lines may connect SPUs 102A and 102B with trusted data storage region 130. Such communication lines may include one or more dedicated hardware connections and/or one or more data buses. DMA command 120 may be transmitted along such communication lines. Generally, communication between SPUs 102 and trusted data storage region 130 may be bi-directional, to enable SPUs 120 to either store data from and/or store data to one or more trusted data storage locations.

Each trusted data storage location of the storage region 130 may have a unique authorization code associated therewith or may be accessible with an authorization code common to one or more, and possibly all, trusted data storage locations within the trusted data storage region 130. Furthermore, an authorization code operative to grant access to one or more trusted data storage locations may be provided to one or more specific processors 102 (and therefore be accessed only by such one or more processors). Alternatively, an authorization code may be provided to all participating processors within the data processing system 100.

To aid the understanding of various descriptions of the embodiments described herein, DMA will now be described in greater detail. Herein, the term "DMA request" corresponds to the term "DMA command." Over the past few years, DMA has become an increasingly important aspect of computer architecture. Multiprocessor systems have been developed using DMA to provide ever faster processing capabilities.

There are two principal commands that can be issued by a processor for execution by a DMA controller (DMAC): loading (reading data) and storing (writing data). Depending upon the devices within a data processing system, a processor may have the ability to load from and/or store to various devices including but not limited to Input/Output (I/O) registers, other hardware registers, another processor's local memory, and/or a main memory.

It has become possible to incorporate multiprocessors, DMACs, Bus Interface Units (BIUs), and data buses onto a single chip. Consolidation of such devices onto a single chip enables the provision of the combined package within a smaller footprint and increased processing speed. The data flow of such a system starts from the processor core 112, which may dispatch a DMA command 120, which command 120 may be stored in a DMA command queue. Each DMA command 120 may be unrolled (separated) into a smaller bus request for communication to the BIU. The resulting unrolled request may be stored in the BIU outstanding bus request queue. The BIU may then forward the request to the bus controller.

Generally, such requests may be transmitted out of the BIU in the order in which they were received from the DMAC. Once a bus request is completed, the BIU outstanding bus request queue entry is generally available to receive a new DMA request.

As will be discussed in more detail below, the DMA command 120 most preferably includes the authorization data in order to be effective in accessing trusted data locations in the trusted data storage region 130. The DMA command 120 also preferably specifies a physical memory address which has not been and cannot be subject to alteration either by a memory address offset or by memory address translation.

Figure 2:
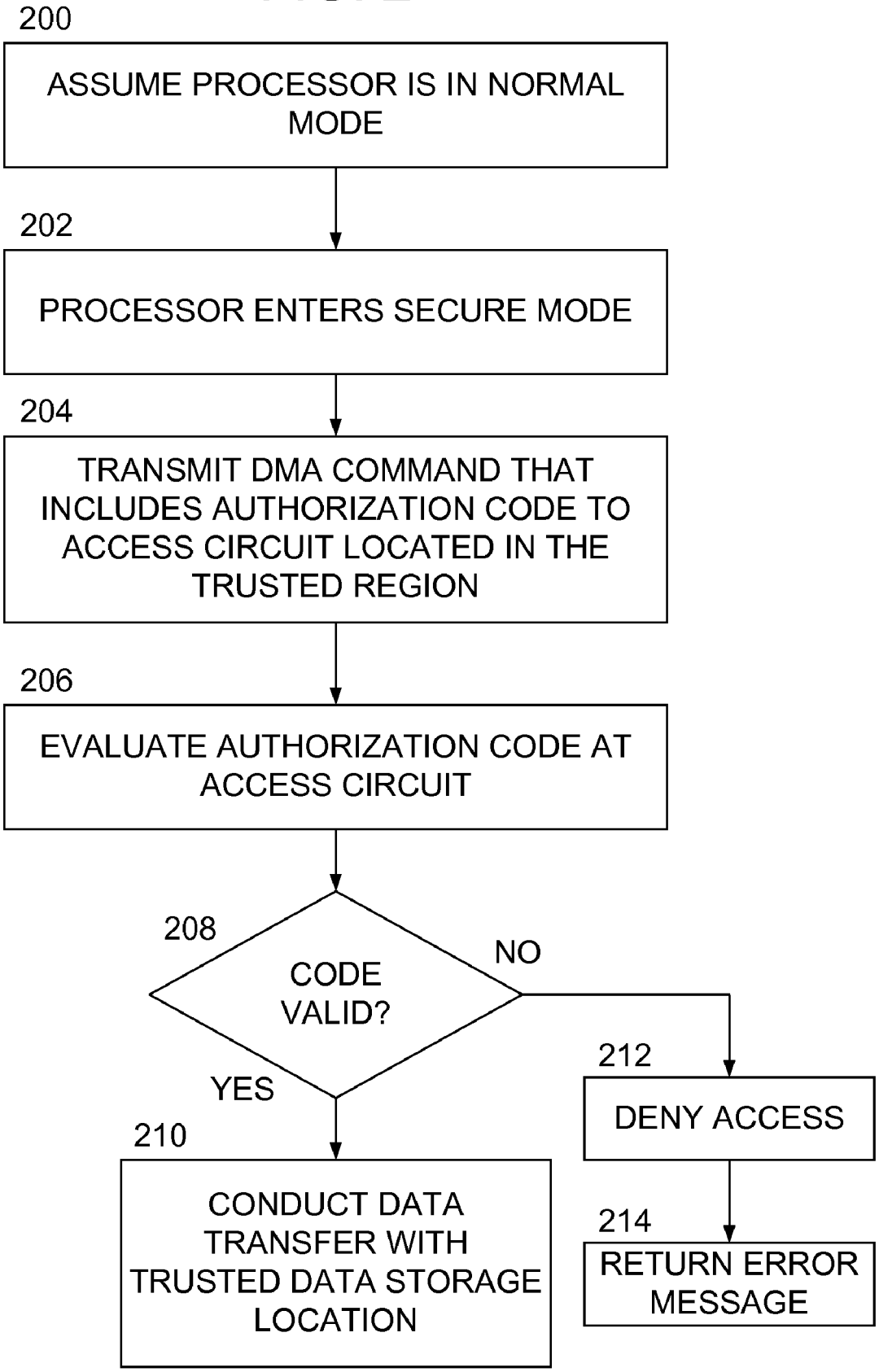
FIG. 2 is a flow diagram of a method for enabling access by a processor to a trusted data storage location within a trusted data storage region in accordance with one or more embodiments of the present invention.

FIG. 2 is a flow diagram of a method for enabling access by processor 102 to trusted data storage location 134 within trusted data storage region 130 in accordance with one or more embodiments of the present invention.

In one or more embodiments, processor 102 may be in at least two operational modes. These modes preferably include a first mode (normal mode), whereby the processor 102 and any external device or devices may initiate a transfer of information into or out of the processor 102, e.g., into or out of the local memory 104. The operational modes also preferably include a second mode (secure mode), whereby the processor 102 may initiate a transfer of information into or out of the processor 102, but no external device or devices may initiate a transfer of information into or out of the processor 102.

It may be assumed (action 200) that processor 102 is in the normal mode as the method begins. At action 202, processor 102 may enter the secure mode. Preferably, while in the secure mode, memory-mapped input-output registers 116 of memory flow controller 114 are not accessible to entities external to processor 102.

Herein, operation within the secure mode by processor 102 enables DMA store and load operations requested by processor 102 to be completed once an initial DMA command has been issued by processor 102. The completion of such DMA store and load operations are considered to be transfers of information initiated by processor 102.

If access to a trusted data storage location, such as trusted location 134, is needed, processor 102 preferably gathers address information for the pertinent trusted data storage location and an authorization code for accessing the trusted data storage location 138. The authorization code is preferably incorporated into the DMA command 120. It is preferred that the authorization code can only be incorporated into the DMA command 120 when the processor 102 is in the secure mode. This functionality is preferably achieved in hardware or firmware by making the authorization code inaccessible to the processor core 112 unless the processor 102 is in the secure mode. For example, the authorization code may be stored in a secure ROM that is unlocked only when the processor 102 is in the secure mode.

Further, it is preferred that the address of the DMA command 120 is not subject to address offset or address translation. In other words, the DMA command 120 preferably specifies a physical address, not a virtual address.

At action 204, memory flow controller 114 of processor 102 preferably transmits the DMA command 120 to the trusted data storage region 130. Next, access circuit 132 preferably receives the DMA command 120 and preferably determines whether to grant access to the data storage location 138 to which access is sought. Access circuit 132 preferably ensures that the data storage location 138 to which access is sought is associated with the trusted data storage region 130.

Access circuit 132 may next determine whether an authorization code is needed for the requested access. For instance, if an incoming DMA command seeks access (for either a load or store operation) to freely accessible data storage location 136, an authorization code is generally not needed.

If the incoming DMA command 120 requests access to a trusted data storage location, such as trusted locations 134 and 138, access circuit 132 preferably evaluates (action 206) the authorization code, which code may be embedded within DMA command 120. If the authorization code is determined not to be valid (action 208), access circuit 132 preferably denies access (action 212) to the storage location specified in the DMA command 120. In this situation, an error message may be returned (action 214) to the requesting entity, such as processor 102.

If the authorization code is found to be valid (action 208), access circuit 312 preferably enables access to the trusted data storage location specified in the DMA command 120 to the requesting device, such as SPU 102. Thereafter, the data transfer sought in connection with the transmission of DMA command 120 is preferably conducted (action 210).

In one or more embodiments, access circuit 132 may evaluate the received authorization code by comparing same to a predetermined code. Generally, if the received authorization code matches the predetermined code, access to the trusted data storage location specified in the received DMA command 120 is granted.

In one or more embodiments, the predetermined code may be stored in a register, local memory, main memory or other storage device. Alternatively, the predetermined code may be provided when needed, either by a hardware circuit, or by software running on a processor.

The foregoing process and apparatus permits processors 102 to extend the security that they enjoy internally at least partially to an external storage area. Indeed, at least an elevated level of trust may be associated with the trusted locations of the trusted data storage region 130 because they may only be accessed by processors 102 in a secure mode of operation. This ensures that any data stored in the trusted location are not corrupt.

Figure 3:
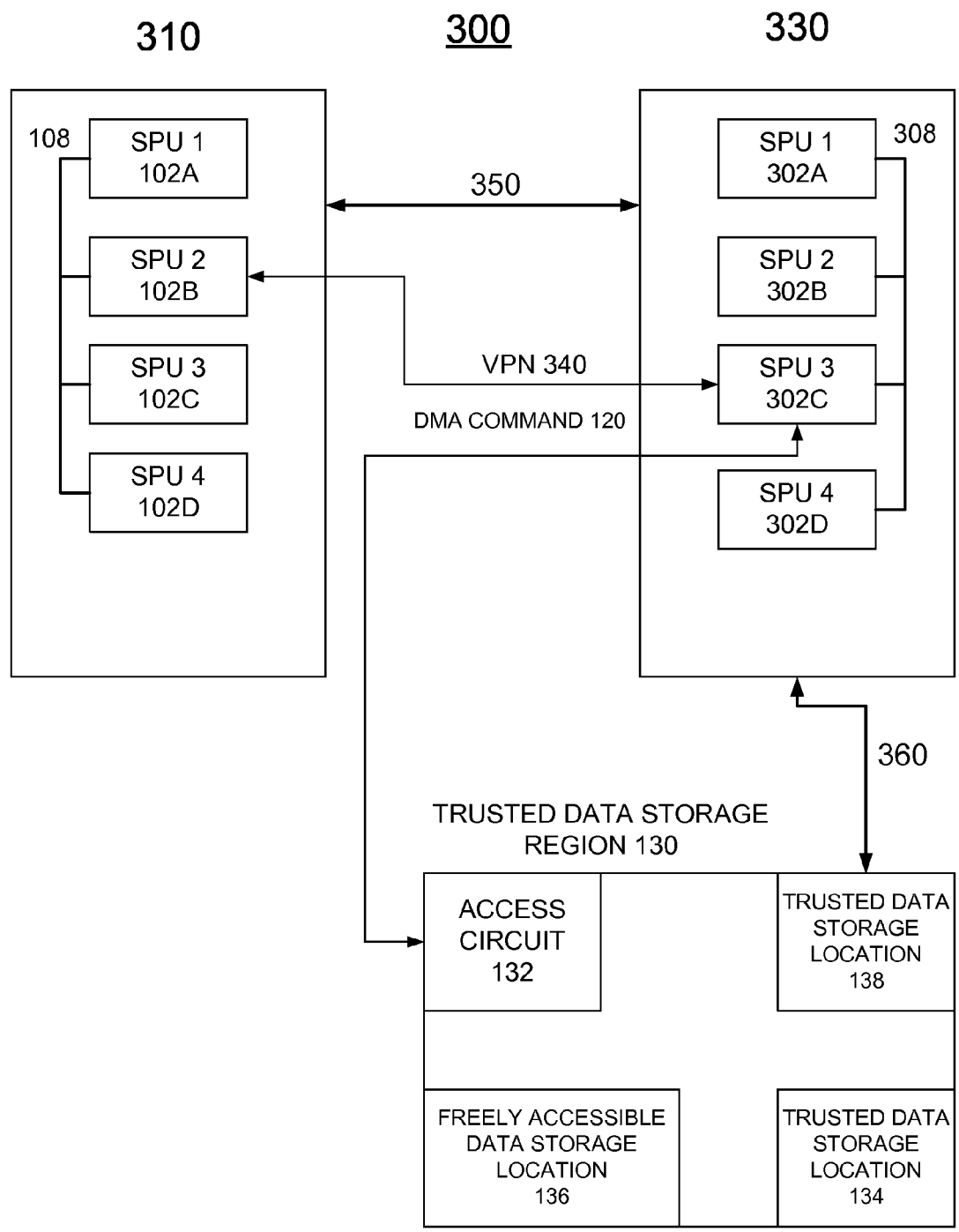
FIG. 3 is a block diagram of a data processing system enabling access to a trusted data storage region by a processor over a virtual private network (VPN) in accordance with one or more embodiments of the present invention.

FIG. 3 is a block diagram of a data processing system 300 enabling access by a processor 102 in a first multiprocessor system to a trusted data storage region 130 via an intervening second multiprocessor system over a virtual private network (VPN) 340 in accordance with one or more embodiments of the present invention. Data processing system 300 may include multiprocessor system 310, multiprocessor system 330, communication links 350 and 360, and trusted data storage region 130.

In one or more embodiments, multiprocessor system 310 may include four SPUs 102A-102D, and data bus 108 for enabling communication between the SPUs 102. Multiprocessor system 330 is preferably like multiprocessor system 310 and may include four SPUs 302A-302D and data bus 308 for enabling communication between SPUs 302. The construction and operation of multiprocessor system 330 may be substantially the same as that of multiprocessor system 310.

In one or more embodiments, communication link 350 is preferably disposed between multiprocessor system 310 and multiprocessor system 330 to enable communication therebetween. Communication link 350 may include one or more dedicated hardware connections, one or more data buses, and/or a combination of the foregoing. Communication link 360 may couple multiprocessor system 330 and trusted region 130 to enable communication therebetween. As with communication link 350, communication link 360 may include one or more dedicated hardware connections, one or more data buses, and/or a combination of the foregoing.

Data processing system 300 preferably includes trusted data storage region 130. However, data processing system 300 could also include one or more additional trusted data storage regions as was discussed above with respect to FIG. 1. The constituent data storage portions of trusted region 130 and the types of physical data storage devices which could include trusted region 130 were discussed in connection with FIG. 1, and that discussion is therefore not repeated in this section.

Figure 4A:
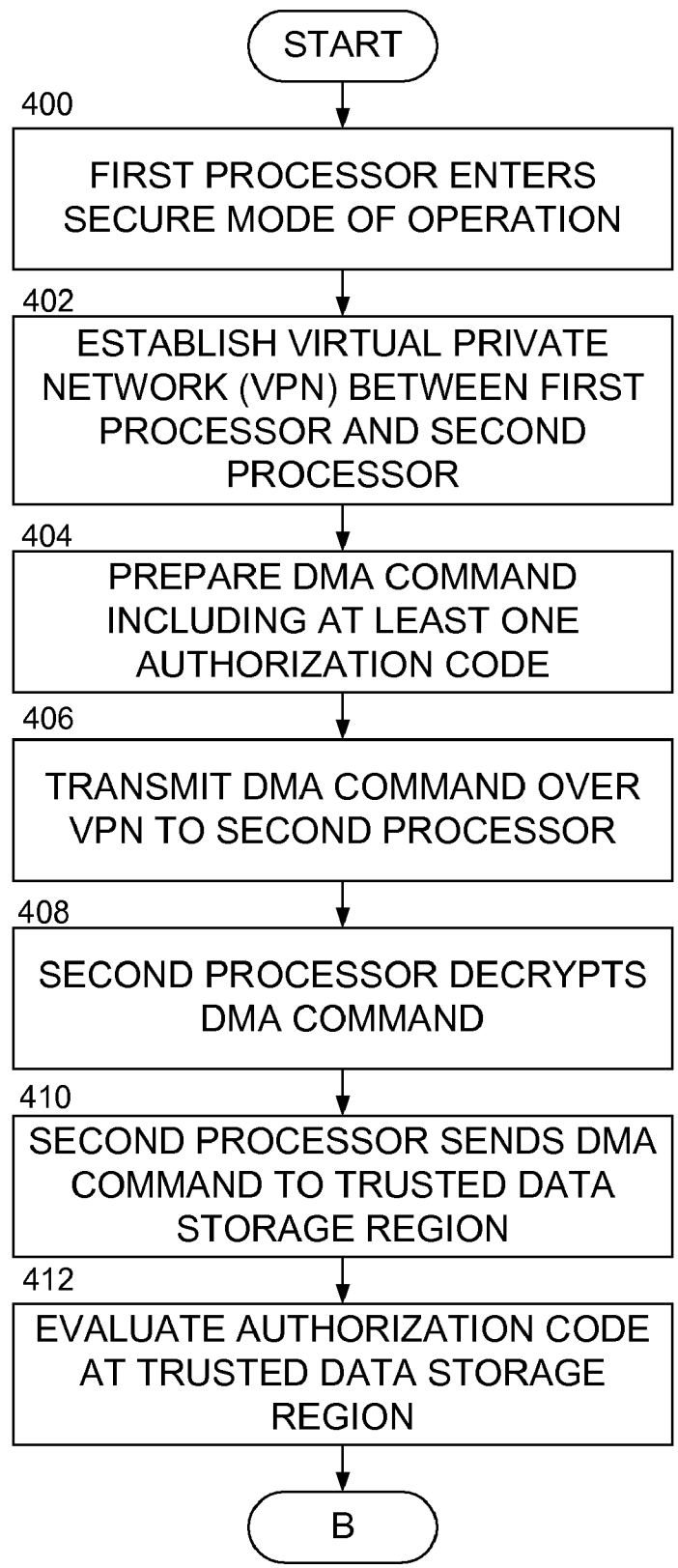
FIGS. 4A-4B are flow diagrams of a method for transmitting a direct memory access (DMA) command from a first processor to a trusted data storage location using at least one intermediate processor in accordance with one or more embodiments of the present invention.
Figure 4B:
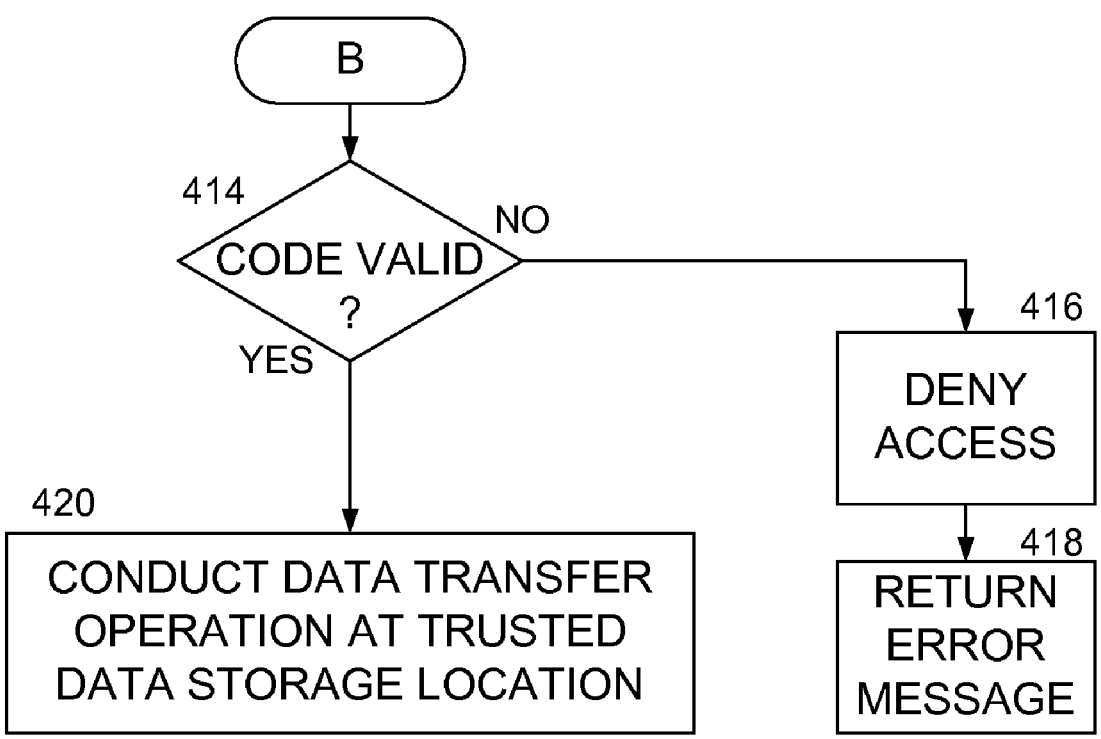

FIG. 4 is a flow diagram of a method for transmitting a DMA command from a first processor SPU2 102B to a trusted data storage region 130 using an intermediary, second processor SPU3 302C in accordance with one or more embodiments of the present invention.

At action 400, SPU2 102B of multiprocessor 310 preferably enters a secure mode of operation. At action 402, SPU2 102B preferably establishes a VPN 340 with SPU3 302C of multiprocessor 330. The actions which may be followed for establishing a VPN are presented below as part of a continuing discussion of action 402.

With reference to FIG. 5, the SPUs 102 and 302 are preferably operable to enter into secure modes of communication with one another, such as, for instance, a providing a virtual private network (VPN). This may be carried out by a first processor SPU2 102B and a second processor SPU3 302C in accordance with the following procedure: The first processor SPU2 102B and the second processor SPU3 302C may exchange public keys by transmitting same over communication link 350 (action 430). Next, the first processor SPU2 102B may produce at least one random number (action 432). The first processor SPU2 102B may encrypt the random number using the public key of the second processor SPU3 302C (action 434).

Thereafter, the first processor SPU2 102B may transmit the encrypted random number to the second processor SPU3 302C over communication link 350 (action 436). At action 438, the second processor SPU3 302C may decrypt the random number utilizing its private key, where the private key is paired with the public key thereof. At this point, both the first and second processors SPU2 102B and SPU3 302C are privy to the same random number, which random number is not accessible by the other processors or external devices unless such access is permitted. At action 440, the first and second processors SPU2 102B and SPU3 302C may utilize the random number to encrypt further communication therebetween, thereby establishing a virtual private network between these two processors.

At action 404, SPU2 102B preferably prepares a DMA command 120, which command may include at least one authorization code. SPU2 102B then preferably transmits (action 406) DMA command 120 to SPU3 302C across communication link 350 over VPN 340.

Upon receiving DMA command 120, SPU3 302C may decrypt same (action 408), as the DMA command 120 is encrypted when traversing the VPN 340. At action 410, SPU3 302C may transmit DMA command 120 (now preferably in unencrypted form) to access circuit 132 of trusted data storage region 130.

At action 412, access circuit 132 preferably determines whether the authorization code included in DMA command 120 is valid. If the authorization code is valid (action 414), access to one or more of trusted data storage locations 134 and 138 may be granted. At action 420, the requested data transfer at the selected trusted data storage location may be conducted.

If the authorization code is not valid (action 414), access to the requested trusted data storage location is preferably denied (action 416), and an error message may be returned (action 418) to SPU3 302C which may then, in turn, be forwarded to SPU2 102B.

This section describes the details of load and store operations which may be performed within the system of FIG. 3. The first case considered is where the data transfer operation of action 420 is a store operation. In this case, where access circuit 132 grants access to the requested trusted data storage location (action 434), a suitable handshaking signal is preferably returned to SPU3 302C to indicate same. Thereafter, SPU3 302C preferably encrypts this information in accordance with VPN 340 and transmits same in turn to SPU2 102B. SPU2 102B may then encrypt the data to be stored in accordance with VPN 340 and transmit same to SPU3 302C. Upon receiving this data, SPU3 302C preferably decrypts same, and transmits the unencrypted data to trusted data storage region 130 for storage therein.

Where step 420 is a "read" operation, once access circuit 132 grants access to the requested trusted data storage location, suitable handshaking is preferably conducted between trusted data storage region 130 and SPU3 302C, after which the data which is the subject of the read request is preferably transmitted from trusted data storage region 130 to SPU3 302C. Thereafter, the data is preferably encrypted in accordance with VPN 340 and transmitted to SPU2 102B, thereby completing the read operation.

In the above-described method, the transfer of data to SPU2 102B resulting from a read operation issued therefrom and handshaking information used to notify SPU2 102B to send data for storage within trusted data storage region 130 upon receiving permission to do so from access circuit 132 are considered to be transfers of information initiated by SPU2 102B and are therefore consistent with the operation of SPU2 102B within the "secure mode" defined earlier herein.

In one or more embodiments, the functionality of the system of FIG. 3 may be extended to include one or more intermediary SPUs between SPU2 102B and SPU3 302C. In such embodiments, VPNs may be implemented throughout a sequence of SPUs, of whatever length, leading from the SPU requesting the data transfer to the last SPU in the chain, which preferably communicates directly with trusted data storage region 130. Preferably, in this embodiment, data would be prepared at a first processor, encrypted in accordance with the first processor's outgoing VPN, and transmitted to the second processor. Thereafter, each successive processor preferably receives encrypted data, decrypts the data, re-encrypts the data in accordance with its outgoing VPN, and transmits the data to the next processor in the sequence. The last step of the process would preferably be modified for the last processor in the sequence. The last processor preferably receives the data, decrypts the data in accordance with the VPN established between the last and second-to-last processors in the sequence, and then transmits the data to the trusted data storage region.

While the discussion of FIGS. 3 and 5 is directed to an embodiment involving two SPUs located on two respective multiprocessor systems (310 and 330), the present invention could be practiced employing fewer or more than two multiprocessor systems. Specifically, a sequence of two or more SPUs could be located within a single multiprocessor system. Moreover, where a longer sequence of SPUs is employed, the SPUs within this chain could be disposed within three or more multiprocessor systems.

FIG. 6 is a block diagram of a multi-processing system 100A that may be adapted to implement the features discussed herein and one or more further embodiments of the present invention. The system 100A includes a plurality of processors 102A-D, associated local memories 104A-D, and a shared memory 106 interconnected by way of a bus 108. The shared memory 106 may also be referred to herein as a main memory or system memory. The methods and/or circuit functionality discussed above may also be applied to the circuit configuration of FIG. 6, where the processors 102 are the circuit blocks discussed above.

Although four processors 102 are illustrated by way of example, any number may be utilized without departing from the spirit and scope of the present invention. Each of the processors 102 may be of similar construction or of differing construction. The local memories 104 are preferably located on the same chip (same semiconductor substrate) as their respective processors 102; however, the local memories 104 are preferably not traditional hardware cache memories in that there are no on chip or off chip hardware cache circuits, cache registers, cache memory controllers, etc. to implement a hardware cache memory function.

The processors 102 preferably provide data access requests to copy data (which may include program data) from the system memory 106 over the bus 108 into their respective local memories 104 for program execution and data manipulation. The mechanism for facilitating data access is preferably implemented utilizing a direct memory access controller (DMAC), not shown. The DMAC of each processor is preferably of substantially the same capabilities as discussed hereinabove with respect to other features of the invention.

The system memory 106 is preferably a dynamic random access memory (DRAM) coupled to the processors 102 through a high bandwidth memory connection (not shown). Although the system memory 106 is preferably a DRAM, the memory 106 may be implemented using other means, e.g., a static random access memory (SRAM), a magnetic random access memory (MRAM), an optical memory, a holographic memory, etc.

Each processor 102 is preferably implemented using a processing pipeline, in which logic instructions are processed in a pipelined fashion. Although the pipeline may be divided into any number of stages at which instructions are processed, the pipeline generally comprises fetching one or more instructions, decoding the instructions, checking for dependencies among the instructions, issuing the instructions, and executing the instructions. In this regard, the processors 102 may include an instruction buffer, instruction decode circuitry, dependency check circuitry, instruction issue circuitry, and execution stages.

In one or more embodiments, the processors 102 and the local memories 104 may be disposed on a common semiconductor substrate. In one or more further embodiments, the shared memory 106 may also be disposed on the common semiconductor substrate or it may be separately disposed.

In one or more alternative embodiments, one or more of the processors 102 may operate as a main processor operatively coupled to the other processors 102 and capable of being coupled to the shared memory 106 over the bus 108. The main processor may schedule and orchestrate the processing of data by the other processors 102. Unlike the other processors 102, however, the main processor may be coupled to a hardware cache memory, which is operable cache data obtained from at least one of the shared memory 106 and one or more of the local memories 104 of the processors 102. The main processor may provide data access requests to copy data (which may include program data) from the system memory 106 over the bus 108 into the cache memory for program execution and data manipulation utilizing any of the known techniques, such as DMA techniques.

A description of a preferred computer architecture for a multi-processor system will now be provided that is suitable for carrying out one or more of the features discussed herein. In accordance with one or more embodiments, the multi-processor system may be implemented as a single-chip solution operable for stand-alone and/or distributed processing of media-rich applications, such as game systems, home terminals, PC systems, server systems and workstations. In some applications, such as game systems and home terminals, real-time computing may be a necessity. For example, in a real-time, distributed gaming application, one or more of networking image decompression, 3D computer graphics, audio generation, network communications, physical simulation, and artificial intelligence processes have to be executed quickly enough to provide the user with the illusion of a real-time experience. Thus, each processor in the multi-processor system must complete tasks in a short and predictable time.

To this end, and in accordance with this computer architecture, all processors of a multi processing computer system are constructed from a common computing module (or cell). This common computing module has a consistent structure and preferably employs the same instruction set architecture. The multi processing computer system can be formed of one or more clients, servers, PCs, mobile computers, game machines, PDAs, set top boxes, appliances, digital televisions and other devices using computer processors.

A plurality of the computer systems may also be members of a network if desired. The consistent modular structure enables efficient, high speed processing of applications and data by the multi processing computer system, and if a network is employed, the rapid transmission of applications and data over the network. This structure also simplifies the building of members of the network of various sizes and processing power and the preparation of applications for processing by these members.

Figure 7:
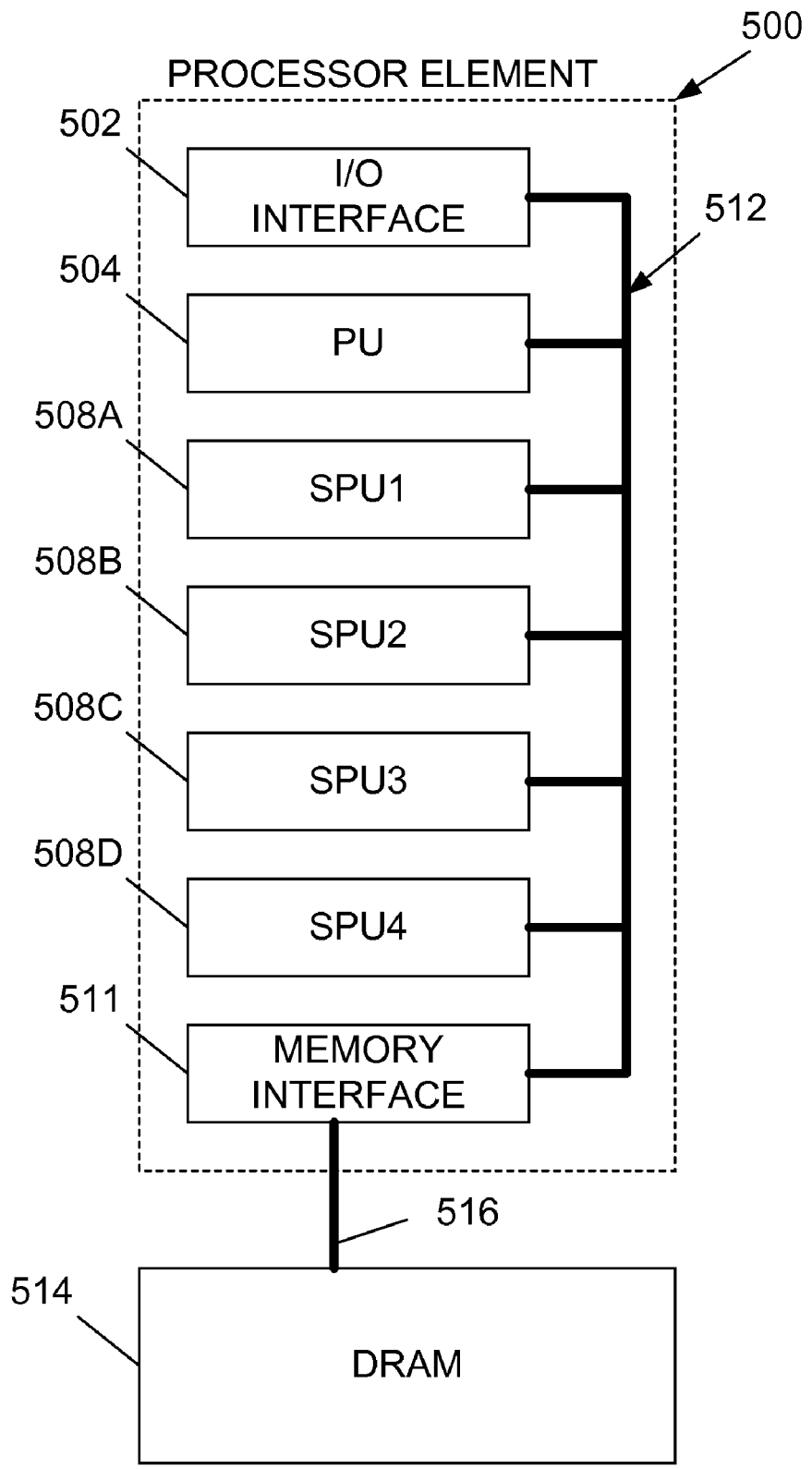
FIG. 7 is a diagram illustrating a preferred processor element (PE) that may be used to implement one or more further aspects of the present invention.

With reference to FIG. 7, the basic processing module is a processor element (PE) 500. The PE 500 comprises an I/O interface 502, a processing unit (PU) 504, and a plurality of sub processing units 508, namely, sub processing unit 508A, sub processing unit 508B, sub processing unit 508C, and sub processing unit 508D. A local (or internal) PE bus 512 transmits data and applications among the PU 504, the sub processing units 508, and a memory interface 511. The local PE bus 512 can have, e.g., a conventional architecture or can be implemented as a packet-switched network. If implemented as a packet switch network, while requiring more hardware, increases the available bandwidth.

The PE 500 can be constructed using various methods for implementing digital logic. The PE 500 preferably is constructed, however, as a single integrated circuit employing a complementary metal oxide semiconductor (CMOS) on a silicon substrate. Alternative materials for substrates include gallium arsenide, gallium aluminum arsenide and other so called III B compounds employing a wide variety of dopants. The PE 500 also may be implemented using superconducting material, e.g., rapid single flux quantum (RSFQ) logic.

The PE 500 is closely associated with a shared (main) memory 514 through a high bandwidth memory connection 516. Although the memory 514 preferably is a dynamic random access memory (DRAM), the memory 514 could be implemented using other means, e.g., as a static random access memory (SRAM), a magnetic random access memory (MRAM), an optical memory, a holographic memory, etc.

The PU 504 and the sub-processing units 508 are preferably each coupled to a memory flow controller (MFC) including direct memory access DMA functionality, which in combination with the memory interface 511, facilitate the transfer of data between the DRAM 514 and the sub processing units 508 and the PU 504 of the PE 500. It is noted that the DMAC and/or the memory interface 511 may be integrally or separately disposed with respect to the sub processing units 508 and the PU 504. Indeed, the DMAC function and/or the memory interface 511 function may be integral with one or more (preferably all) of the sub processing units 508 and the PU 504. It is also noted that the DRAM 514 may be integrally or separately disposed with respect to the PE 500. For example, the DRAM 514 may be disposed off-chip as is implied by the illustration shown or the DRAM 514 may be disposed on-chip in an integrated fashion.

The PU 504 can be, e.g., a standard processor capable of stand alone processing of data and applications. In operation, the PU 504 preferably schedules and orchestrates the processing of data and applications by the sub processing units. The sub processing units preferably are single instruction, multiple data (SIMD) processors. Under the control of the PU 504, the sub processing units perform the processing of these data and applications in a parallel and independent manner. The PU 504 is preferably implemented using a PowerPC core, which is a microprocessor architecture that employs reduced instruction-set computing (RISC) technique. RISC performs more complex instructions using combinations of simple instructions. Thus, the timing for the processor may be based on simpler and faster operations, enabling the microprocessor to perform more instructions for a given clock speed.

It is noted that the PU 504 may be implemented by one of the sub processing units 508 taking on the role of a main processing unit that schedules and orchestrates the processing of data and applications by the sub processing units 508. Further, there may be more than one PU implemented within the processor element 500.

In accordance with this modular structure, the number of PEs 500 employed by a particular computer system is based upon the processing power required by that system. For example, a server may employ four PEs 500, a workstation may employ two PEs 500 and a PDA may employ one PE 500. The number of sub processing units of a PE 500 assigned to processing a particular software cell depends upon the complexity and magnitude of the programs and data within the cell.

Figure 8:
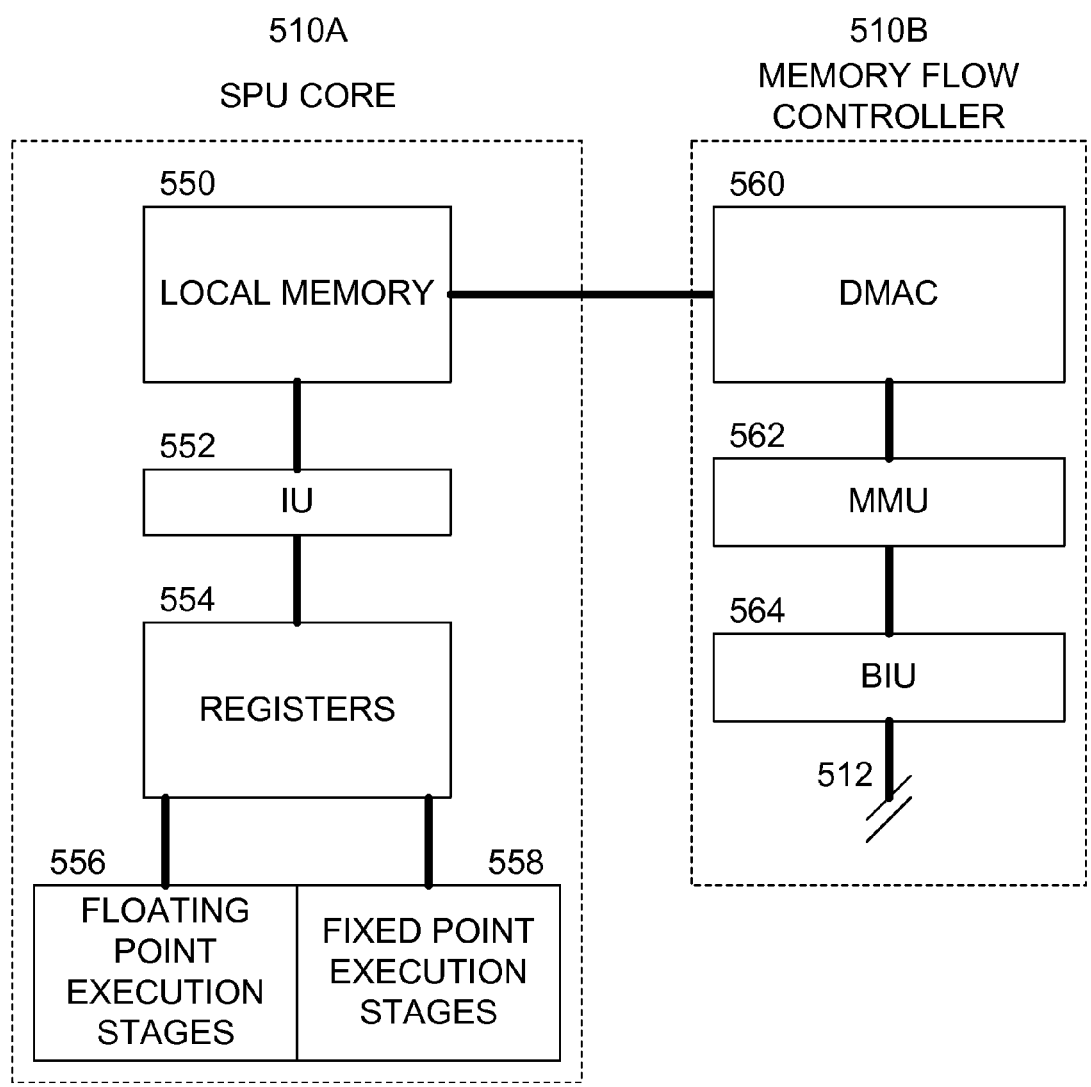
FIG. 8 is a diagram illustrating the structure of an exemplary sub processing unit (SPU) of the system of FIG. 7 that may be adapted in accordance with one or more further aspects of the present invention.

FIG. 8 illustrates the preferred structure and function of a sub processing unit (SPU) 508. The SPU 508 architecture preferably fills a void between general-purpose processors (which are designed to achieve high average performance on a broad set of applications) and special-purpose processors (which are designed to achieve high performance on a single application). The SPU 508 is designed to achieve high performance on game applications, media applications, broadband systems, etc., and to provide a high degree of control to programmers of real-time applications. Some capabilities of the SPU 508 include graphics geometry pipelines, surface subdivision, Fast Fourier Transforms, image processing keywords, stream processing, MPEG encoding/decoding, encryption, decryption, device driver extensions, modeling, game physics, content creation, and audio synthesis and processing.

The sub processing unit 508 includes two basic functional units, namely an SPU core 510A and a memory flow controller (MFC) 510B. The SPU core 510A performs program execution, data manipulation, etc., while the MFC 510B performs functions related to data transfers between the SPU core 510A and the DRAM 514 of the system.

The SPU core 510A includes a local memory 550, an instruction unit (IU) 552, registers 554, one or more floating point execution stages 556 and one or more fixed point execution stages 558. The local memory 550 is preferably implemented using single-ported random access memory, such as an SRAM. Whereas most processors reduce latency to memory by employing caches, the SPU core 510A implements the relatively small local memory 550 rather than a cache. Indeed, in order to provide consistent and predictable memory access latency for programmers of real-time applications (and other applications as mentioned herein) a cache memory architecture within the SPU 508A is not preferred.

The cache hit/miss characteristics of a cache memory results in volatile memory access times, varying from a few cycles to a few hundred cycles. Such volatility undercuts the access timing predictability that is desirable in, for example, real-time application programming. Latency hiding may be achieved in the local memory SRAM 550 by overlapping DMA transfers with data computation. This provides a high degree of control for the programming of real-time applications. As the latency and instruction overhead associated with DMA transfers exceeds that of the latency of servicing a cache miss, the SRAM local memory approach achieves an advantage when the DMA transfer size is sufficiently large and is sufficiently predictable (e.g., a DMA command can be issued before data is needed).

A program running on a given one of the sub-processing units 508 references the associated local memory 550 using a local address, however, each location of the local memory 550 is also assigned a real address (RA) within the overall system's memory map. This allows Privilege Software to map a local memory 550 into the Effective Address (EA) of a process to facilitate DMA transfers between one local memory 550 and another local memory 550. The PU 504 can also directly access the local memory 550 using an effective address. In a preferred embodiment, the local memory 550 contains 556 kilobytes of storage, and the capacity of registers 552 is 128×128 bits.

The SPU core 504A is preferably implemented using a processing pipeline, in which logic instructions are processed in a pipelined fashion. Although the pipeline may be divided into any number of stages at which instructions are processed, the pipeline generally comprises fetching one or more instructions, decoding the instructions, checking for dependencies among the instructions, issuing the instructions, and executing the instructions. In this regard, the IU 552 includes an instruction buffer, instruction decode circuitry, dependency check circuitry, and instruction issue circuitry.

The instruction buffer preferably includes a plurality of registers that are coupled to the local memory 550 and operable to temporarily store instructions as they are fetched. The instruction buffer preferably operates such that all the instructions leave the registers as a group, i.e., substantially simultaneously. Although the instruction buffer may be of any size, it is preferred that it is of a size not larger than about two or three registers.

In general, the decode circuitry breaks down the instructions and generates logical micro-operations that perform the function of the corresponding instruction. For example, the logical micro-operations may specify arithmetic and logical operations, load and store operations to the local memory 550, register source operands and/or immediate data operands. The decode circuitry may also indicate which resources the instruction uses, such as target register addresses, structural resources, function units and/or busses. The decode circuitry may also supply information indicating the instruction pipeline stages in which the resources are required. The instruction decode circuitry is preferably operable to substantially simultaneously decode a number of instructions equal to the number of registers of the instruction buffer.

The dependency check circuitry includes digital logic that performs testing to determine whether the operands of given instruction are dependent on the operands of other instructions in the pipeline. If so, then the given instruction should not be executed until such other operands are updated (e.g., by permitting the other instructions to complete execution). It is preferred that the dependency check circuitry determines dependencies of multiple instructions dispatched from the decoder circuitry 112 simultaneously.

The instruction issue circuitry is operable to issue the instructions to the floating point execution stages 556 and/or the fixed point execution stages 558.

The registers 554 are preferably implemented as a relatively large unified register file, such as a 128-entry register file. This allows for deeply pipelined high-frequency implementations without requiring register renaming to avoid register starvation. Renaming hardware typically consumes a significant fraction of the area and power in a processing system. Consequently, advantageous operation may be achieved when latencies are covered by software loop unrolling or other interleaving techniques.

Preferably, the SPU core 510A is of a superscalar architecture, such that more than one instruction is issued per clock cycle. The SPU core 510A preferably operates as a superscalar to a degree corresponding to the number of simultaneous instruction dispatches from the instruction buffer, such as between 2 and 3 (meaning that two or three instructions are issued each clock cycle). Depending upon the required processing power, a greater or lesser number of floating point execution stages 556 and fixed point execution stages 558 may be employed. In a preferred embodiment, the floating point execution stages 556 operate at a speed of 32 billion floating point operations per second (32 GFLOPS), and the fixed point execution stages 558 operate at a speed of 32 billion operations per second (32 GOPS).

The MFC 510B preferably includes a bus interface unit (BIU) 564, a memory management unit (MMU) 562, and a direct memory access controller (DMAC) 560. With the exception of the DMAC 560, the MFC 510B preferably runs at half frequency (half speed) as compared with the SPU core 510A and the bus 512 to meet low power dissipation design objectives. The MFC 510B is operable to handle data and instructions coming into the SPU 508 from the bus 512, provides address translation for the DMAC, and snoop-operations for data coherency. The BIU 564 provides an interface between the bus 512 and the MMU 562 and DMAC 560. Thus, the SPU 508 (including the SPU core 510A and the MFC 510B) and the DMAC 560 are connected physically and/or logically to the bus 512.

The MMU 562 is preferably operable to translate effective addresses (taken from DMA commands) into real addresses for memory access. For example, the MMU 562 may translate the higher order bits of the effective address into real address bits. The lower-order address bits, however, are preferably untranslatable and are considered both logical and physical for use to form the real address and request access to memory. In one or more embodiments, the MMU 562 may be implemented based on a 64-bit memory management model, and may provide 264 bytes of effective address space with 4K-, 64K-, 1M-, and 16M-byte page sizes and 256 MB segment sizes. Preferably, the MMU 562 is operable to support up to 265 bytes of virtual memory, and 242 bytes (4 TeraBytes) of physical memory for DMA commands. The hardware of the MMU 562 may include an 8-entry, fully associative SLB, a 256-entry, 4 way set associative TLB, and a 4×4 Replacement Management Table (RMT) for the TLB—used for hardware TLB miss handling.

The DMAC 560 is preferably operable to manage DMA commands from the SPU core 510A and one or more other devices such as the PU 504 and/or the other SPUs. There may be three categories of DMA commands: Put commands, which operate to move data from the local memory 550 to the shared memory 514; Get commands, which operate to move data into the local memory 550 from the shared memory 514; and Storage Control commands, which include SLI commands and synchronization commands. The synchronization commands may include atomic commands, send signal commands, and dedicated barrier commands. In response to DMA commands, the MMU 562 translates the effective address into a real address and the real address is forwarded to the BIU 564.

The SPU core 510A preferably uses a channel interface and data interface to communicate (send DMA commands, status, etc.) with an interface within the DMAC 560. The SPU core 510A dispatches DMA commands through the channel interface to a DMA queue in the DMAC 560. Once a DMA command is in the DMA queue, it is handled by issue and completion logic within the DMAC 560. When all bus transactions for a DMA command are finished, a completion signal is sent back to the SPU core 510A over the channel interface.

Figure 9:
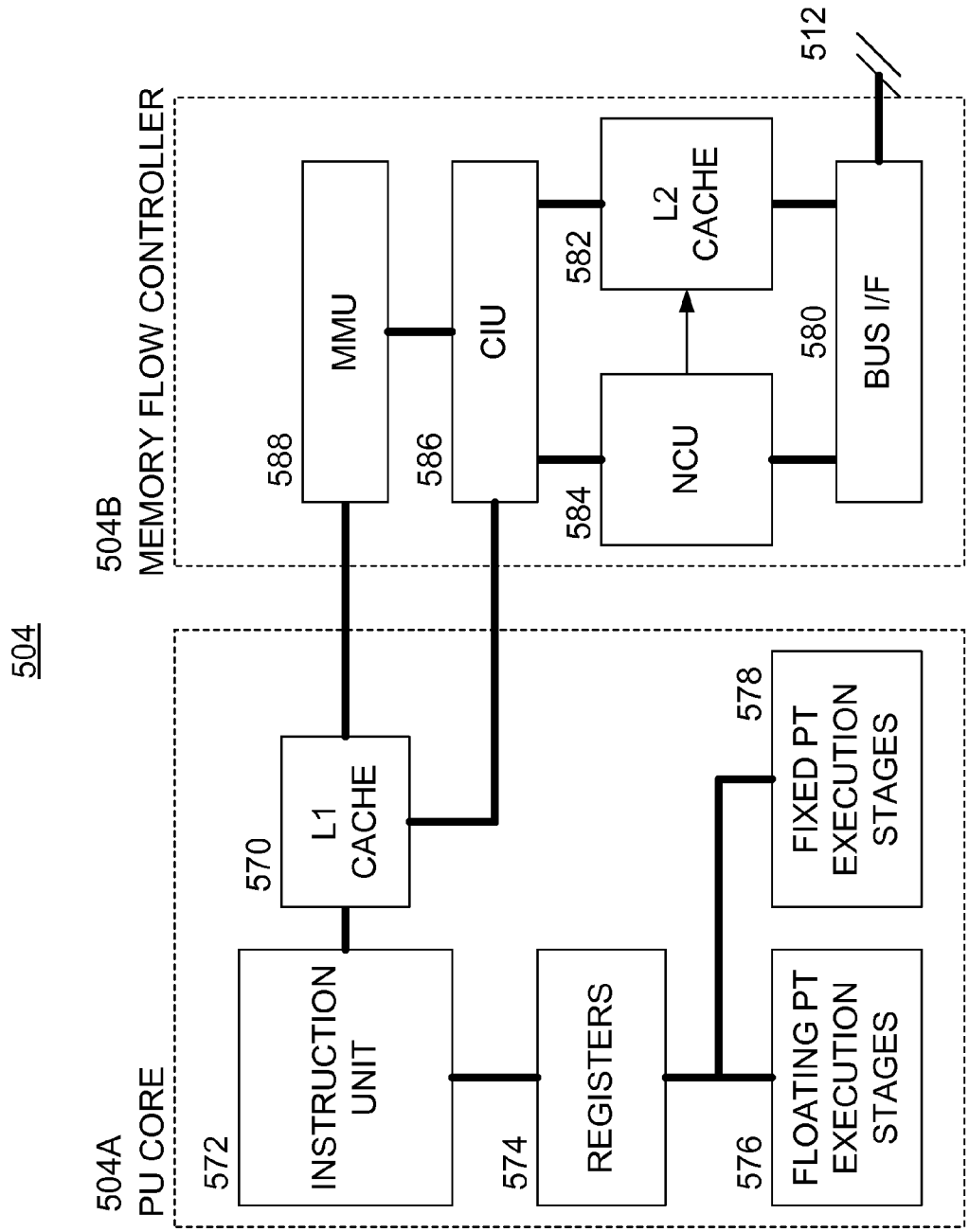
FIG. 9 is a diagram illustrating the structure of an exemplary processing unit (PU) of the system of FIG. 7 that may be adapted in accordance with one or more further aspects of the present invention.

FIG. 9 illustrates the preferred structure and function of the PU 504. The PU 504 includes two basic functional units, the PU core 504A and the memory flow controller (MFC) 504B. The PU core 504A performs program execution, data manipulation, multi-processor management functions, etc., while the MFC 504B performs functions related to data transfers between the PU core 504A and the memory space of the system 100.

The PU core 504A may include an L1 cache 570, an instruction unit 572, registers 574, one or more floating point execution stages 576 and one or more fixed point execution stages 578. The L1 cache provides data caching functionality for data received from the shared memory 106, the processors 102, or other portions of the memory space through the MFC 504B. As the PU core 504A is preferably implemented as a superpipeline, the instruction unit 572 is preferably implemented as an instruction pipeline with many stages, including fetching, decoding, dependency checking, issuing, etc. The PU core 504A is also preferably of a superscalar configuration, whereby more than one instruction is issued from the instruction unit 572 per clock cycle. To achieve a high processing power, the floating point execution stages 576 and the fixed point execution stages 578 include a plurality of stages in a pipeline configuration. Depending upon the required processing power, a greater or lesser number of floating point execution stages 576 and fixed point execution stages 578 may be employed.

The MFC 504B includes a bus interface unit (BIU) 580, an L2 cache memory, a non-cachable unit (NCU) 584, a core interface unit (CIU) 586, and a memory management unit (MMU) 588. Most of the MFC 504B runs at half frequency (half speed) as compared with the PU core 504A and the bus 108 to meet low power dissipation design objectives.

The BIU 580 provides an interface between the bus 108 and the L2 cache 582 and NCU 584 logic blocks. To this end, the BIU 580 may act as a Master as well as a Slave device on the bus 108 in order to perform fully coherent memory operations. As a Master device it may source load/store requests to the bus 108 for service on behalf of the L2 cache 582 and the NCU 584. The BIU 580 may also implement a flow control mechanism for commands which limits the total number of commands that can be sent to the bus 108. The data operations on the bus 108 may be designed to take eight beats and, therefore, the BIU 580 is preferably designed around 128 byte cache-lines and the coherency and synchronization granularity is 128 KB.

The L2 cache memory 582 (and supporting hardware logic) is preferably designed to cache 512 KB of data. For example, the L2 cache 582 may handle cacheable loads/stores, data pre-fetches, instruction fetches, instruction pre-fetches, cache operations, and barrier operations. The L2 cache 582 is preferably an 8-way set associative system. The L2 cache 582 may include six reload queues matching six (6) castout queues (e.g., six RC machines), and eight (64-byte wide) store queues. The L2 cache 582 may operate to provide a backup copy of some or all of the data in the L1 cache 570. Advantageously, this is useful in restoring state(s) when processing nodes are hot-swapped. This configuration also permits the L1 cache 570 to operate more quickly with fewer ports, and permits faster cache-to-cache transfers (because the requests may stop at the L2 cache 582). This configuration also provides a mechanism for passing cache coherency management to the L2 cache memory 582.

The NCU 584 interfaces with the CIU 586, the L2 cache memory 582, and the BIU 580 and generally functions as a queueing/buffering circuit for non-cacheable operations between the PU core 504A and the memory system. The NCU 584 preferably handles all communications with the PU core 504A that are not handled by the L2 cache 582, such as cache-inhibited load/stores, barrier operations, and cache coherency operations. The NCU 584 is preferably run at half speed to meet the aforementioned power dissipation objectives.

The CIU 586 is disposed on the boundary of the MFC 504B and the PU core 504A and acts as a routing, arbitration, and flow control point for requests coming from the execution stages 576, 578, the instruction unit 572, and the MMU unit 588 and going to the L2 cache 582 and the NCU 584. The PU core 504A and the MMU 588 preferably run at full speed, while the L2 cache 582 and the NCU 584 are operable for a 2:1 speed ratio. Thus, a frequency boundary exists in the CIU 586 and one of its functions is to properly handle the frequency crossing as it forwards requests and reloads data between the two frequency domains.

The CIU 586 is comprised of three functional blocks: a load unit, a store unit, and reload unit. In addition, a data pre-fetch function is performed by the CIU 586 and is preferably a functional part of the load unit. The CIU 586 is preferably operable to: (i) accept load and store requests from the PU core 504A and the MMU 588; (ii) convert the requests from full speed clock frequency to half speed (a 2:1 clock frequency conversion); (iii) route cachable requests to the L2 cache 582, and route non-cachable requests to the NCU 584; (iv) arbitrate fairly between the requests to the L2 cache 582 and the NCU 584; (v) provide flow control over the dispatch to the L2 cache 582 and the NCU 584 so that the requests are received in a target window and overflow is avoided; (vi) accept load return data and route it to the execution stages 576, 578, the instruction unit 572, or the MMU 588; (vii) pass snoop requests to the execution stages 576, 578, the instruction unit 572, or the MMU 588; and (viii) convert load return data and snoop traffic from half speed to full speed.

The MMU 588 preferably provides address translation for the PU core 540A, such as by way of a second level address translation facility. A first level of translation is preferably provided in the PU core 504A by separate instruction and data ERAT (effective to real address translation) arrays that may be much smaller and faster than the MMU 588.

In a preferred embodiment, the PU 504 operates at 4-6 GHz, 10F04, with a 64-bit implementation. The registers are preferably 64 bits long (although one or more special purpose registers may be smaller) and effective addresses are 64 bits long. The instruction unit 570, registers 572 and execution stages 574 and 576 are preferably implemented using PowerPC technology to achieve the (RISC) computing technique.

Additional details regarding the modular structure of this computer system may be found in U.S. Pat. No. 6,526,491, the entire disclosure of which is hereby incorporated by reference.

In accordance with at least one further aspect of the present invention, the methods and apparatus described above may be achieved utilizing suitable hardware, such as that illustrated in the figures. Such hardware may be implemented utilizing any of the known technologies, such as standard digital circuitry, any of the known processors that are operable to execute software and/or firmware programs, one or more programmable digital devices or systems, such as programmable read only memories (PROMs), programmable array logic devices (PALs), etc. Furthermore, although the apparatus illustrated in the figures are shown as being partitioned into certain functional blocks, such blocks may be implemented by way of separate circuitry and/or combined into one or more functional units. Still further, the various aspects of the invention may be implemented by way of software and/or firmware program(s) that may be stored on suitable storage medium or media (such as floppy disk(s), memory chip(s), etc.) for transportability and/or distribution.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method, comprising:
   entering a secure mode by a processor, whereby only said processor may initiate a transfer of information into or out of said processor, but no external device may initiate a transfer of information into said processor and no external device may initiate a transfer of information out of said processor;
   sending a DMA (direct memory access) command including at least one authorization code from said processor to at least one trusted data storage region external to said processor wherein said authorization code is stored in a secure ROM that is unlocked only when said processor is in said secure mode and said DMA command specifies a physical memory address not subject to alteration by a memory address offset or by memory address translation;
   evaluating said authorization code; and
   enabling said processor to access at least one trusted data storage location within said at least one trusted data storage region if said authorization code is valid.

2. The method of claim 1 wherein said DMA command is transmitted by a memory flow controller within said processor.

3. The method of claim 2 further comprising prohibiting access to memory-mapped input-output registers of said memory flow controller by entities other than said processor when said processor is in said secure mode.

4. The method of claim 2 wherein said evaluating step is performed by an access circuit within said at least one trusted data storage region.

5. The method of claim 1 wherein said evaluating step comprises:
   comparing said authorization code to a predetermined code.

6. The method of claim 1 wherein said authorization code is associated with said processor such that said at least one trusted data storage location is accessible only by said processor.

7. The method of claim 1 wherein said at least one trusted data storage location is accessible by any processor in said secure mode issuing a DMA command therefrom that includes the authorization code.

8. The method of claim 1 wherein said at least one authorization code provides access to any data storage location within said at least one trusted data storage region.

9. The method of claim 1 wherein said at least one authorization code provides access to a subset of a plurality of trusted data storage locations within said at least one trusted data storage region.

10. The method of claim 1 wherein said at least one trusted data storage region is located in one of the group consisting of:
    a main memory of a multiprocessor system including said processor, at least one hardware register, local storage of said processor, a hard drive, and another processor within said multiprocessor system including said processor.

11. The method of claim 1 further comprising:
    establishing a different authorization code for each of a plurality of trusted data storage locations within said at least one trusted data storage region.

12. The method of claim 1 further comprising:
    establishing a single authorization code for all of a plurality of trusted data storage locations within said at least one trusted data storage region.

13. The method of claim 1, wherein said authorization code is incorporated into the DMA command only upon said processor entering said secure mode.

14. An apparatus, comprising:
    a data processing system having at least one processor and at least one trusted data storage region external to said at least one processor, the data processing system being operable to:
        enter a secure mode by said at least one processor, whereby said at least one processor may initiate a transfer of information into said at least one processor, but no external device may initiate a transfer of information into said at least one processor and no external device may initiate a transfer of information out of said processor;
        send a DMA (direct memory access) command including at least one authorization code from said at least one processor to said at least one trusted data storage region external to said at least one processor;
        specifying in said DMA command, a physical memory address of the trusted data storage region that is not subject to alteration by a memory address offset or by memory address translation;
        evaluate said authorization code; and
        enable said at least one processor to access at least one trusted data storage location within said at least one trusted data storage region if said authorization code is valid; and
    a secure ROM that is operable to store the authorization code, the secure ROM is unlocked only when said processor is in said secure mode.

15. The apparatus of claim 14 wherein said DMA command is transmitted by a memory flow controller within said at least one processor.

16. The apparatus of claim 15, said apparatus being further operable to:
    prohibit access to memory-mapped input-output registers of said memory flow controller by entities other than said at least one processor when said at least one processor is in said secure mode.

17. The apparatus of claim 14 wherein said evaluating step is performed by an access circuit within said at least one trusted data storage region.

18. The apparatus of claim 14 wherein said evaluating step comprises:
comparing said authorization code to a predetermined code.

19. The apparatus of claim 14 wherein said authorization code is associated with said at least one processor such that said trusted data storage location is accessible only by said at least one processor.

20. The apparatus of claim 14 wherein said at least one trusted data storage location is accessible by any processor in said secure mode issuing a DMA command therefrom that includes the authorization code.

21. The apparatus of claim 14 wherein said at least one authorization code provides access to any data storage location within said at least one trusted data storage region.

22. The apparatus of claim 14 wherein said at least one authorization code provides access to a subset of a plurality of trusted data storage locations within said trusted data storage region.

23. The apparatus of claim 14 wherein said trusted data storage region is located in one of the group consisting of:
a main memory of a multiprocessor system including said processor, at least one hardware register, local storage of said processor, a hard drive, and another processor within said multiprocessor system including said processor.

24. The apparatus of claim 14 further comprising:
establishing a different authorization code for each of a plurality of trusted data storage locations within said at least one trusted data storage region.

25. The apparatus of claim 14 further comprising:
establishing a single authorization code for all of a plurality of trusted data storage locations within said at least one trusted data storage region.

26. A method, comprising:
entering a secure mode by a first processor, whereby said processor may initiate a transfer of information into or out of said processor, but no external device may initiate a transfer of information into said processor and no external device may initiate a transfer of information out of said processor;
preparing a DMA command including at least one authorization code and at least one physical memory address of the trusted data storage region that is not subject to alteration by a memory address offset or by memory address translation in order to enable a data transfer operation at least one trusted data storage region external to said first processor, the at least one authorization code is retrieved from a secure ROM that is unlocked only when the first processor is in the secure mode;
establishing a virtual private network (VPN) between said first processor and a second processor;
encrypting said DMA command in accordance with said VPN; and
transmitting said encrypted DMA command over said VPN to said second processor.

27. The method of claim 26 further comprising:
decrypting said DMA command at said second processor.

28. The method of claim 27 further comprising:
sending said DMA command to said at least one trusted data storage region.

29. The method of claim 28 further comprising:
evaluating said authorization code at said at least one trusted data storage region; and
conducting said data transfer operation if said authorization code is valid.

30. The method of claim 29 wherein said conducting step comprises:
performing a store operation to at least one trusted data storage location within said at least one trusted data storage region.

31. The method of claim 30 wherein said store operation comprises:
encrypting data for said store operation at said first processor in accordance with said VPN;
transmitting said data to said second processor;
decrypting said data at said second processor;
sending said decrypted data to said trusted data storage region; and
saving said data in at said least one trusted data storage location.

32. The method of claim 29 wherein said conducting comprises:
performing a load operation from at least one trusted data storage location within said at least one trusted data storage region.

33. The method of claim 32 further comprising:
transmitting data from said load operation from said trusted data storage region to said second processor;
encrypting said data at said second processor in accordance with said VPN;
sending said encrypted data from said second processor to said first processor;
decrypting said encrypted data at said first processor; and
storing said decrypted data in said first processor.

34. The method of claim 27 further comprising:
establishing a second VPN between said second processor and a third processor;
encrypting said DMA command according to said second VPN; and
sending said DMA command from said second processor to said third processor.

35. The method of claim 34 further comprising:
decrypting said DMA command at said third processor; and
sending said DMA command to said trusted data storage region.

36. The method of claim 26 wherein said second processor is on a same multiprocessor system as said first processor.

37. The method of claim 26 wherein said first processor is located within a first multiprocessor system and said second processor is located within a second multiprocessor system.

38. An apparatus, comprising:
a data processing system including at least processor and at least one trusted data storage region external to said at least one processor, said data processing system being operable to:
enter a secure mode by a first processor, whereby said processor may initiate a transfer of information into or out of said first processor, but no external device may initiate a transfer of information into said first processor and no external device may initiate a transfer of information out of said first processor;
prepare a DMA command including at least one authorization code and at least one physical memory address of the trusted data storage region that is not subject to alteration by a memory address offset or by memory address translation in order to enable a data transfer operation at said at least one trusted data storage region;

establish a virtual private network (VPN) between said first processor and a second processor;

encrypt said DMA command in accordance with said VPN; and transmit said encrypted DMA command over said VPN to said second processor; and a secure ROM that is operable to store the authorization code, the secure ROM is unlocked only when said processor is in said secure mode.

39. The apparatus of claim 38, said data processing system being further operable to:

decrypt said DMA command at said second processor.

40. The apparatus of claim 39 wherein said data processing system is further operable to:

establish a second VPN between said second processor and a third processor;

encrypt said DMA command according to said second VPN; and send said DMA command from said second processor to said third processor.

41. The apparatus of claim 40, said data processing system being further operable to:

decrypt said DMA command at said third processor; and send said DMA command to said at least one trusted data storage region.

42. The apparatus of claim 38, said data processing system being further operable to:

send said DMA command to said at least one trusted data storage region.

43. The apparatus of claim 42, said data processing system being further operable to:

evaluate said authorization code at said at least one trusted data storage region; and conduct said data transfer operation if said authorization code is valid.

44. The apparatus of claim 43 wherein said conducting step comprises:

performing a store operation to at least one trusted data storage location within said at least one trusted data storage region.

45. The apparatus of claim 44 wherein said store operation comprises:

encrypting data for said store operation at said first processor in accordance with said VPN;

transmitting said data to said second processor;

decrypting said data at said second processor;

sending said decrypted data to said at least one trusted data storage region; and saving said data in at said least one trusted data storage location.

46. The apparatus of claim 43 wherein said conducting step comprises:

performing a load operation from at least one trusted data storage location within said at least one trusted data storage region.

47. The apparatus of claim 46 wherein said data processing system is further operable to:

transmit data from said load operation from said at least one trusted data storage region to said second processor;

encrypt said data at said second processor in accordance with said VPN;

send said encrypted data from said second processor to said first processor;

decrypt said encrypted data at said first processor; and store said decrypted data in said first processor.

48. The apparatus of claim 38 wherein said second processor is on a same multiprocessor system as said first processor.

49. The apparatus of claim 38 wherein said first processor is located within a first multiprocessor system and said second processor is located within a second multiprocessor system.

* * * * *